H. LIPPELT.
DYNAMO ELECTRIC MACHINE.
APPLICATION FILED SEPT. 1, 1911.
1,157,014.
Patented Oct. 19, 1915.
5 SHEETS—SHEET 1.
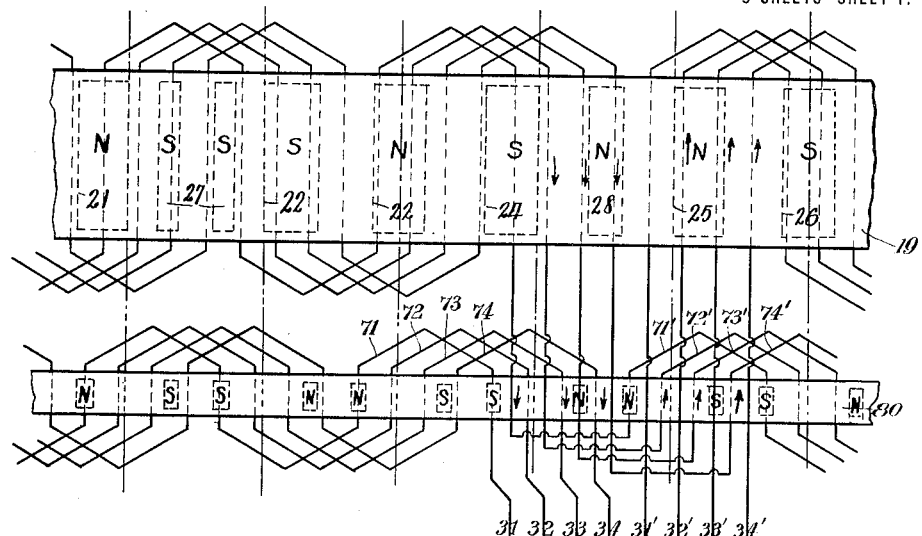
Fig. 1
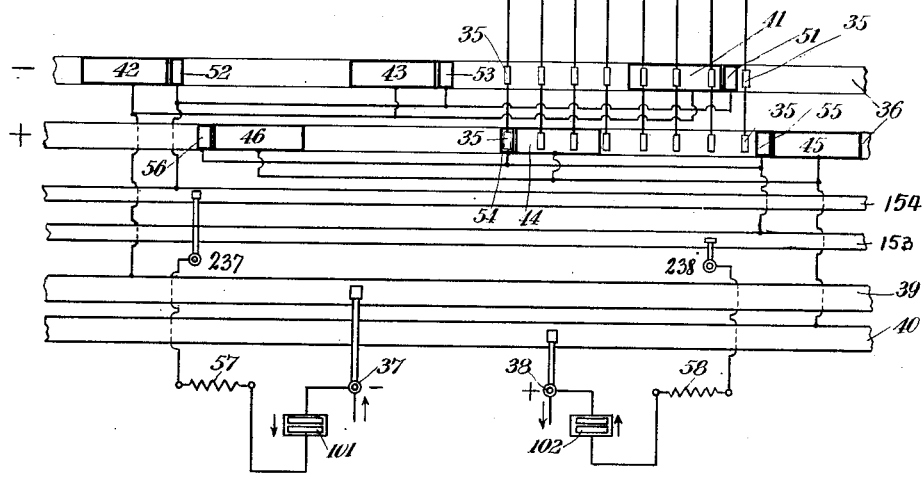
Witnesses:
John E. Prager
A. Worden Gibbs.
Inventor
Hans Lippelt
By his Attorney H. LIPPELT.
DYNAMO ELECTRIC MACHINE.
APPLICATION FILED SEPT. 1, 1911.
1,157,014.
Patented Oct. 19, 1915.
5 SHEETS—SHEET 2.
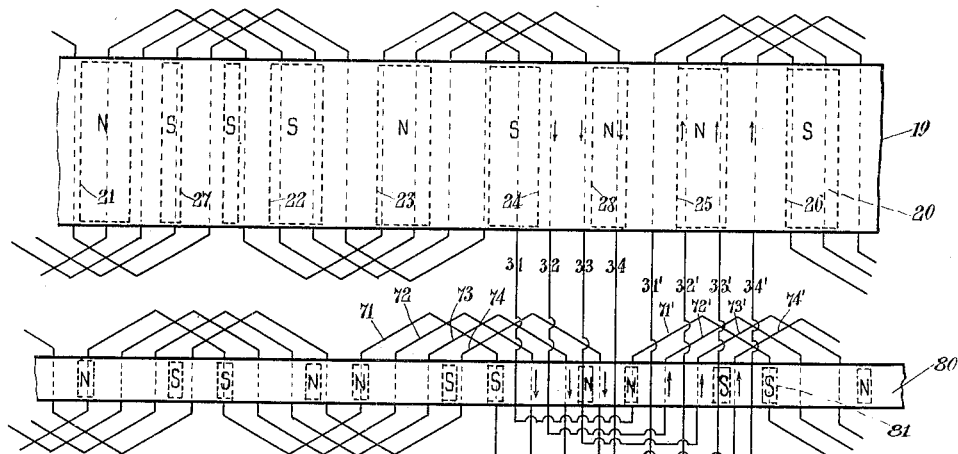
*Fig. 2*
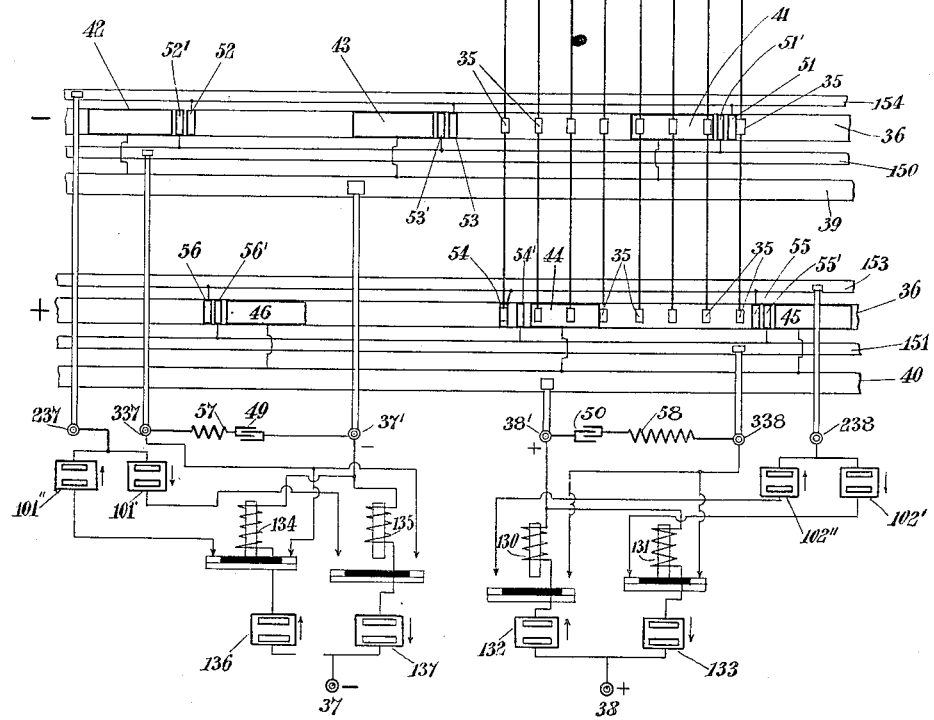
WITNESSES
John E. Frager
A. Worden Gibbs
INVENTOR
Hans Lippelt
BY
Fred'k F. Schuch
ATTORNEY

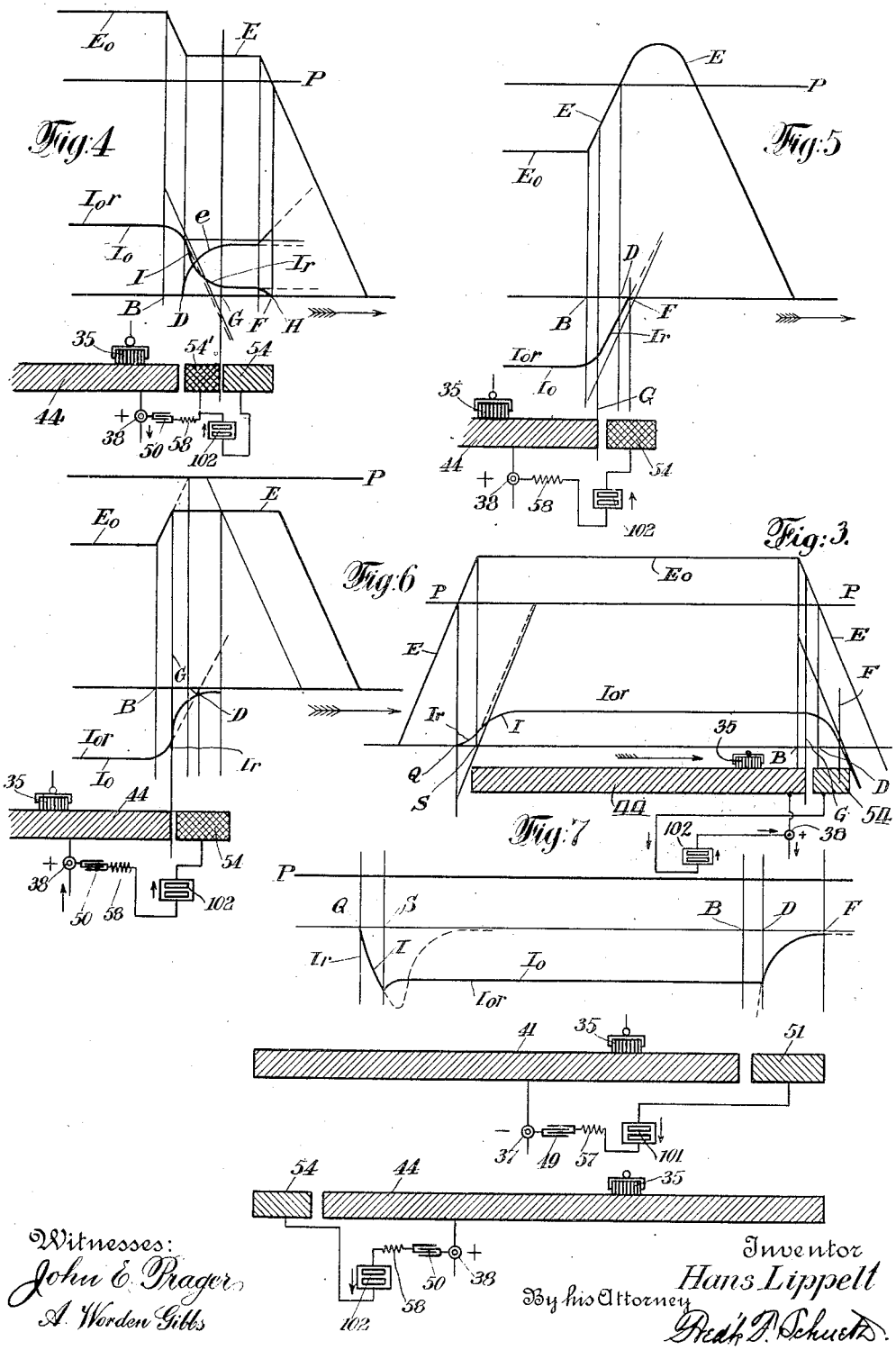

H. LIPPELT.
DYNAMO ELECTRIC MACHINE.
APPLICATION FILED SEPT. 1, 1911.
1,157,014.
Patented Oct. 19, 1915.
5 SHEETS—SHEET 4.
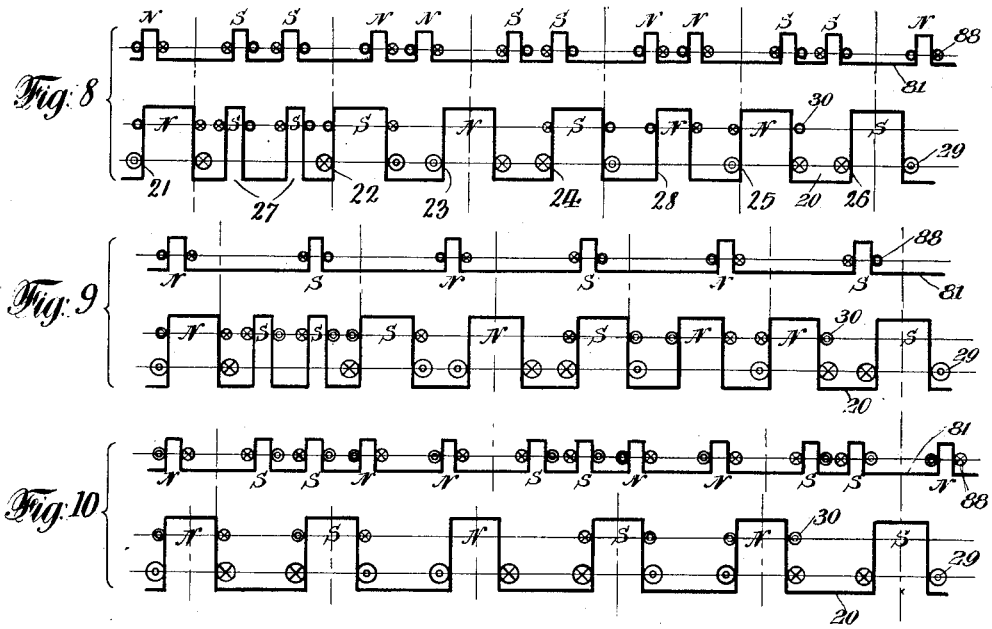
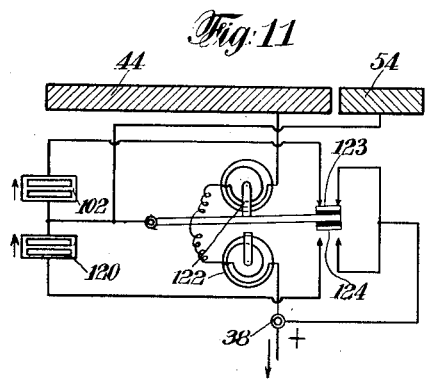
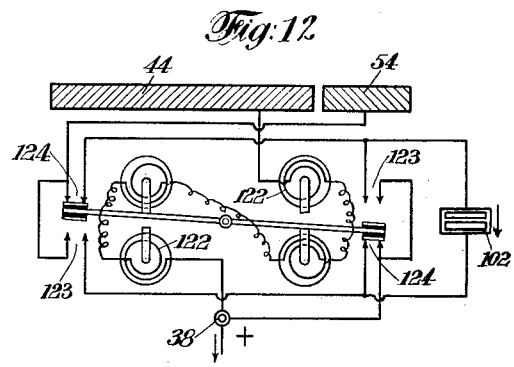
Witnesses:
John E. Prager
A. Worden Gibbs
Inventor
Hans Lippelt
By his Attorney

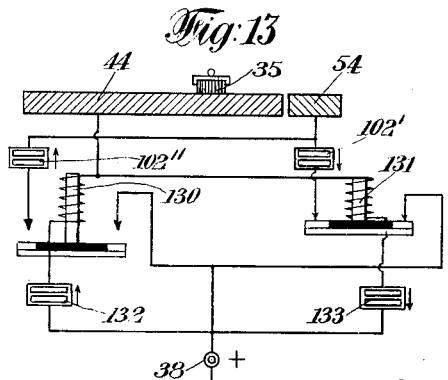
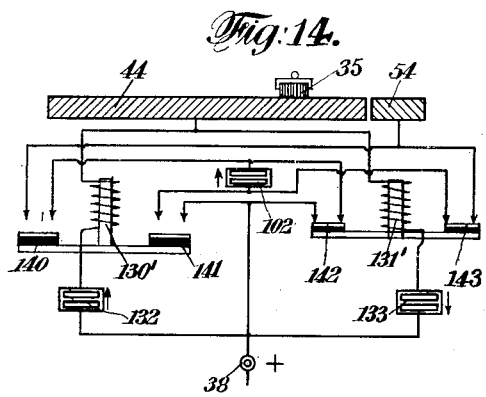
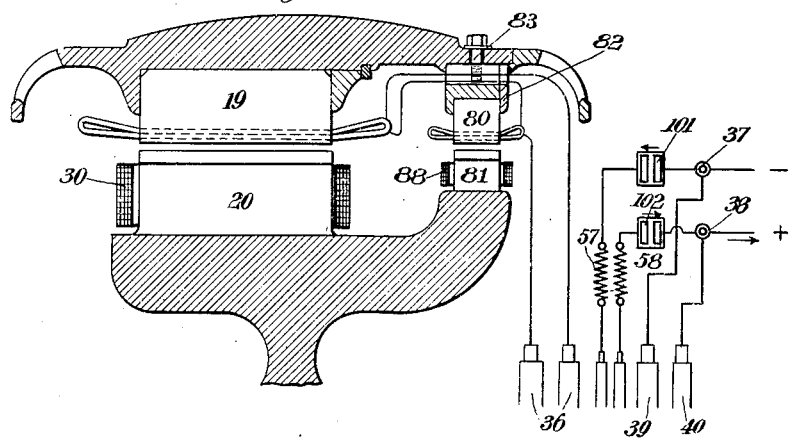
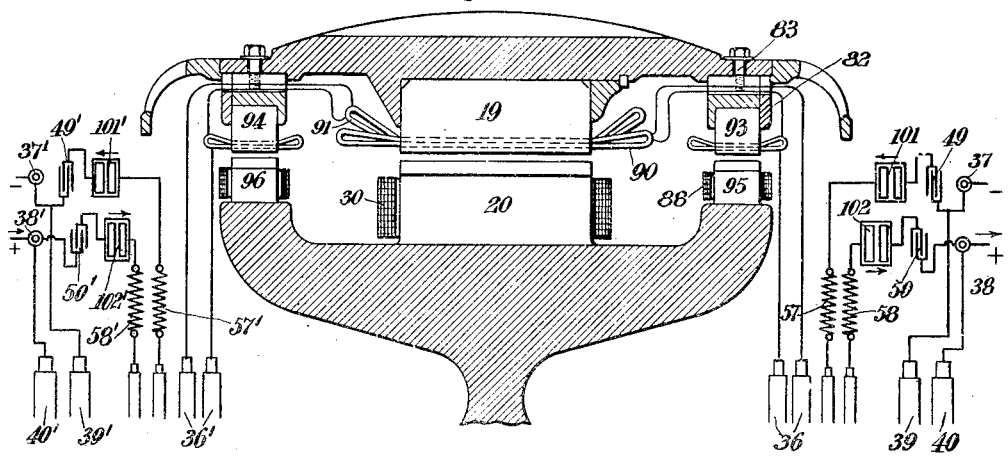

UNITED STATES PATENT OFFICE.

ANS LIPPELT, OF NEW YORK, N. Y.

DYNAMO-ELECTRIC MACHINE.

1,157,014.   Specification of Letters Patent.   Patented Oct. 19, 1915.

Application filed September 1, 1911. Serial No. 647,140.

*To all whom it may concern:*

Be it known that I, HANS LIPPELT, a citizen of the German Empire, and a resident of New York, in the county of New York and State of New York, have invented certain new and useful Improvements in Dynamo-Electric Machines, of which the following is a specification.

The invention relates to dynamo electric machines having an armature of the open-coil type with commutator and brushes to maintain each armature winding in circuit while cutting the flux of the field poles, and in which the field is arranged to induce a substantially uniform voltage in the armature conductors as they pass the said field poles, both under load and at no load.

It has for its object the production of a sparkless commutation of the armature windings whereby sparking may be entirely obviated at all loads and speeds.

The nature of the invention will be best understood when described in connection with the accompanying drawings, in which—

Figure 1 shows a diagrammatic plan view of the armatures, the windings, the commutator and the accessories of the improved machine developed on a plane surface. Fig. 2 is a similar view illustrating, furthermore, current directing means and means for introducing the same into circuit. Figs. 3 to 6 are explanatory diagrams. Fig. 7 is an explanatory diagram of the electrical changes occurring during the starting of a motor. Fig. 8 shows diagrammatically an end view developed along a straight line, of a main and auxiliary field producing means or magnets that may be employed in the dynamo electric machine. Figs. 9 and 10 are similar views illustrating modifications of the field magnets. Figs. 11–14 illustrate diagramatically the manner of automatically connecting the current checking means in case of a reversal of the normal direction of flow. Fig. 15 is a longitudinal section of a machine constructed according to the present invention; and Fig. 16 is a similar view of a dynamotor.

Similar characters of reference designate corresponding parts throughout the several views.

To a better understanding of the present invention a brief description of the operation of an open coil machine will be given, reference being had to Figs. 1 and 3 of the drawings. In the apparatus therein illustrated, 19 designates an armature, considered stationary, and 20 a rotating field magnet, the poles N and S of same being numbered 21 to 28, Figs. 1, 2 and 8. The poles 21 to 26 are the main field poles and are unevenly spaced, the center lines according to an equal spacing being drawn to show the uneven pole-pitch. The poles 27 and 28 are auxiliary poles inserted into the spaces left by the main poles, 27 being bifurcated. The machine itself is to be considered as a six pole machine.

The magnetizing winding 29, and the direction of current in the same, is shown in the conventional manner; and the winding may be series, shunt or both. In addition to this winding 29, the auxiliary poles, as well as such main poles as are displaced from their normal position, because of the uneven pole-pitch, are further provided with an auxiliary winding 30. It will be noted from the direction of current set forth, that this auxiliary magnetization increases the main magnetization of certain of these poles and diminishes that of others. The purpose of such arrangement is to neutralize the effect of the armature reaction and to produce a field—that is to say an E. M. F. curve, which under all loads is for the greater part horizontal (see $E_o$, Fig. 3).

The armature 19, plan of which is shown in Figs. 1 and 2, is, for the sake of example, provided with four windings which are completed through brushes 35 and a commutator 36 to four armature circuits 31—31', 32—32', 33—33', and 34—34'. The winding resembles an open multiphase winding whose $$\text{winding pitch} = \frac{360°}{\text{the number of poles}},$$

or a multiple of the same. In making the end connections, however, proper care is to be taken to suit the flow of current.

By means of the rotating field magnets 20, alternate electro-motive forces are induced in the armature windings and in such a manner that always in at least three armature windings the same or nearly the same electro-motive forces exist. The armature circuits thus energized are periodically connected in parallel through brushes 35 and the commutator 36, the current being delivered to the terminals 37 and 38 of the machine through suitable collector rings 39 and 40. The direction of the current in the armature circuits is indicated in the conventional manner, Fig. 1.

The commutator 36 consists, for the six pole machine under consideration, of six segments 41, 42, 43, 44, 45 and 46 arranged in two rows of three segments each, the segments 41, 42 and 43 being negative and the remaining segments 44, 45 and 46 positive. The segments of same polarity are connected to each other and with corresponding collector rings 39 and 40. Together with a suitable excitation of the rotating field producing means 20, care is taken that the changing inductive effect upon the armature windings corresponds with the periodic connections by the commutator of these windings. The armature windings carry power only so long as they are connected with the commutator segments, and thereby with the line. In the case of a dynamo, current is delivered from the collector rings; and in the case of a motor, it is delivered thereto.

The electrical changes occurring within the armature circuits, in the case of a dynamo, may be studied as disclosed in connection with the explanatory diagram shown in Fig. 3, the arrow designating the relative motion of the armature with respect to the field magnets. $E\ E_o$ designates one-half of a wave of electro-motive force, $P^o$ the constant terminal voltage, $I$ the current strength with a maximum value $I_o$, and $r$ the resistance (assumed constant) of an armature circuit between the points at which it is connected in parallel with the other armature circuits. $Ir$ then represents the ohmic drop in the armature circuit, and the curve $I$ for the current is made to coincide therewith by assuming the proper scale. Beginning at the left end of the diagram, the E. M. F. existing in an armature circuit is zero, and at the position Q it has risen to the terminal voltage P. At about this time the brushes 35 make contact with the proper commutator segments of the commutator 36 and the armature circuit is placed in action. Because of the further increase in the E. M. F. to the value of $E_o$, a gradually increasing current $I$ is developed. In consequence of the self-induction of the armature circuit this current does not rise in a straight line but approaches an asymptote, which asymptote has the same inclination to the zero line as the line E. After the E. M. F. has attained its maximum value $E_o$, the current curve $I$ reverses its direction of curvature and attains after some delay its maximum value $I_o$. At the point B, the E. M. F. and the current begin to decrease again, the E. M. F., however, more rapidly than the current which is again delayed owing to self-induction. At D, the E. M. F. has fallen to a value equal to the terminal voltage P, the difference being therefore zero. The current, however, has still an appreciable value which becomes zero only at F. If the armature circuit be now switched out no sparking will occur, since the current therein is at this instant equal to zero. As is apparent from the current curve, the current in the vicinity of its zero value varies rapidly; and in consequence of which a faulty brush adjustment, even to a comparatively small degree, renders a spark unavoidable. Should the disconnection occur too late, a powerful spark is developed which strongly affects the brushes. A premature disconnection, also, causes the development of a spark, which, however, is soon extinguished and only slightly affects the brushes. This sparking, however, indicates a technical imperfection; and it is the object of the present invention to improve such machines in this respect, obviating the sparking entirely and under all loads and at all speeds for which the machine is designed. Means for effecting such sparkless commutation are found in apparatus for checking the flow of current in a given direction, or an electric check valve, by which term is to be understood a device permitting the flow of current in one direction only. As a suitable check valve, I may employ, for example, an electrolytic iron-aluminum cell of well-known construction. A device of this character is arranged to be introduced into the armature circuits shortly before the windings are disconnected from the terminals of the machine, and will permit the decreasing current to pass therethrough until the same reaches zero value. Any tendency to rise in the opposite direction, however, will be prevented from taking effect due to the checking action of said cell.

Referring now to Figs. 1 and 3, check valves 101 and 102 are provided respectively at the terminals 37 and 38 of the machine, and are arranged to be cut periodically into the two branches 31—31', etc., of the armature circuits. The small arrow at the side of the cells indicates the direction in which the cells permit current to flow therethrough. Commutator 36 is provided with auxiliary segments 51, 52, 53, 54, 55 and 56, which are comparatively narrow and are insulated from the corresponding main commutator segments 41, 42, 43, 44, 45 and 46 by small strips of insulating material, the segments 51, 52, and 53 being shown as located at the right of the corresponding negative segments 41, 42 and 43, while the segments 54, 55 and 56 are at the left of the corresponding positive segments 44, 45 and 46, but, of course a reversal is possible. For high voltages it is advisable to arrange all positive segments on one ring and all negative segments on another ring, as shown, in order to secure good insulation. The segments 51, 52 and 53, which are of the same polarity (negative), are connected to one another; and, likewise, the positive segments 54, 55 and 56.

The cells 101 and 102 are to be connected between the terminals of the machine and the respective auxiliary commutator segments in such a manner that the flow of current therethrough is permitted only in a direction which corresponds with the normal flow of current. For instance, assuming the drawing to refer to a dynamo, the current will then flow from terminal 37 through collector ring 39 to segment 41, through the armature windings, during the latter's working period, from 31' to 31, 32' to 32 and 33' to 33, through brushes 35, segment 44 to the terminal 38 and thence to the line, and back to terminal 37. At a position of the commutator further advanced to the left, viz:—when 33—33' is an outgoing winding, the current within it flows from terminal 37 through cell 101, resistance 57, segment 51 and then as hereinbefore set forth. This cell 101 should be connected in such a manner as to permit the flow of current in the aforesaid direction. When a winding, for example, 31—31', is an ingoing winding and has reached a position corresponding to Q, Fig. 3, current will enter at the terminal 37, and flow as before described to segment 41 through 31'—31 over brush 35 to segment 54, resistance 58, cell 102 to terminal 38. This cell 102 should, therefore, be so connected as to allow the flow of current therethrough in said direction. If the brush 35 bears on segment 54 before the E. M. F. in winding 31—31' has attained a value equal to the terminal voltage, the cell 102 will not permit a flow of current, which flow would be of opposite direction to the one prevailing during the following working period of armature circuit. When 31—31' is an outgoing winding, the cell 102, also, will check the flow of current in a direction opposite to that during the working period.

From the above arrangement for introducing the cells, it follows that the aforesaid connections must be reversed in case of a reversal in the direction of normal flow of current. In the case of a dynamo, such reversal would occur with a change of rotation; and to obviate the necessity of changing the cell connections, the polarity of the field poles may be reversed. In the case of a motor, the reversal of the polarity of the impressed voltage at the terminals of the armature would also necessitate the reversal of the cell connections. In order to occasionally reverse the rotation of the motor, a case occurring in practice, the original polarity of armature terminals and cell connections may be maintained, and the polarity of the field poles may be reversed by employing suitable means. If that, however, is to be avoided, (frequent reversals of direction of rotation of motor,) the polarity of the terminals of armature must be reversed and with it the cell connections. Should a dynamo be caused to run as a motor, as by raising the line voltage by means of another source of electricity, it would also become necessary to reverse the cell connections and, furthermore, such reversal must be accomplished automatically. For the above purposes any suitable, well-known means may be employed, for example the means shown in Figs. 11 to 14 which illustrate merely the principle of automatic reversal of the cell connections.

Fig. 11 shows two electric check valves 102 and 120, a polarized relay 122 provided with contacts 123 and 124, and the main segment 44 and the auxiliary segment 54, also the terminal 38. If current leaves main segment 44, it will flow through relay 122 to the terminal and thereby close the contacts 123. Current can, therefore, flow from the auxiliary segment 54 through check valve 102 to the terminal. If the current from auxiliary segment 54 tends to reverse (position F, Fig. 3), while that from the main segment remains, the said check valve 102 will not permit the flow of a reverse current from auxiliary segment 54. If, however, the polarity of the terminal be changed, causing a reverse flow of current substantially from terminal 38 to segment 44, then the relay 122 will close the contacts 124 and permit the current to flow through the check valve 120 which is effective for this reverse current. The device, therefore, works automatically for both directions of flow of the line current.

Fig. 12 shows a device which differs from that of Fig. 11 only in that it employs one electric check valve instead of two, it being thereby necessary to duplicate the contacts 123 and 124. The duplication of the relay 122 is not necessary, but advisable.

Fig. 13 employs two ordinary relays 130 and 131 instead of one polarized relay (as in Fig. 11). These relays are controlled by separate electric check valves 132 and 133 respectively arranged in reverse direction, and which are introduced between terminal 38 and main segment 44. If for instance, current flows from main segment 44 to terminal 38, it can pass only through relay 131 and the check valve 133. This relay closes the circuit for a check valve 102' and permits the proper flow of current from auxiliary segment 54. If current flows from terminal 38 to main segment 44, the relay 130 and its corresponding check valve 132 will operate and permit the flow through a check valve 102'' arranged in the reverse direction from the check valve 102'.

Fig. 14 shows an arrangement which embodies the same idea, but which employs only one check valve 102 to serve the auxiliary segment. For the main current, the two check valves 132 and 133 with two ordinary relays 130' and 131' are required. The latter are each provided with double contacts 140, 141 and 142, 143 respectively.

Fig. 2 illustrates the general assembly of machine with relays, electrolytic cells, condensers and resistance; and the connection of such apparatus to the commutator and terminals of the machine as well as the manner of introducing condensers into the circuit. The latter are for a purpose hereinafter set forth in the description of Figs. 4 and 5. In Fig. 2, the collector rings 39 and 40 carrying the main part of the current from or to segments 41, 42, 43 and 44, 45, 46, are shown connected to intermediate terminals 37', 38', respectively; and auxiliary segments 51, 52, 53 and 54, 55, 56 are also provided, as in Fig. 1. These auxiliary segments are respectively connected over a collector ring 154 to an intermediate terminal 237, and over a collector ring 153 to an intermediate terminal 238. The purpose of these small additional segments is to direct the current of armature windings during their switching period through auxiliary apparatus. To this end, terminal 237 is connected to two electric check valves (electrolytic cells) 101' and 101'', which permit the flow of current in a direction only as indicated by the arrows beside the check valves. Check valve 101'' allows current to flow only toward 237, while 101'' allows only current from 237 to flow. The check valves are further connected over the contacts of relays 134 and 135 respectively to an intermediate terminal 337 which in turn, through resistance 57 and condenser 49, is connected to terminal 37'. As explained hereinbefore, the latter is in the path of the main current which passes through the exciting windings of relays 134 and 135 and through the electric check valves (electrolytic cells) 136 and 137 to main terminal 37 of machine. These check valves are also connected such that each one permits only the flow of current which the other shuts off and thus directs the main current into only one of the two relays 134 or 135, according to the direction of current flow. Similar connections to terminal 38 can be traced out from right side of Fig. 2.

In operation, the flow of current is as follows: If the machine be considered a dynamo and 37 the negative terminal thereof, then the current will flow from 37 through check valve 136 into winding of relay 134, lift its armature and close contacts. It will further flow to intermediate terminal 37', collector ring 39 and segment 41, thence through armature windings 31'—31, 32'—32, 33'—33. The main part of current will then flow over segment 44 and collect the ring 40 to intermediate terminal 38', through relay 131, check valve 133 to main terminal 38 and finally through line back to terminal 37. Armature of relay 131 will be lifted and contacts closed. Current flowing through winding end 31 to segment 54 will take its way over collector ring 153, intermediate terminal 238, check valve 102', contacts of relay 131 to intermediate terminal 338. Current will then pass through resistance 58 and charge condenser 50 whose other side will discharge current toward terminal 38' and thus establish a connection with main current. The duty of resistance and condenser is to force the current to attain a certain limit valve, as explained hereinafter, while cell 102' will guard against flow of current opposite in direction to that passing through segment 44. If the commutator moves to the left, the next prominent position will be that where segment 54' is connected to winding end 31. 31—31' is then an ingoing winding. Current in 31 will then reach terminal 338 directly and without passing through check valve 102'. It is assumed that the danger of false flow of current does not exist any more because of the advanced position of field magnet, which moves with the commutator. For outgoing windings, as for instance 34—34', relay 134 and check valve 101'' will guard against reversal of current, as can be easily traced out. That the arrangement as per Fig. 2 answers also for a reversed rotation of machine and for reversed polarity of terminals of machine, can readily be ascertained by following flow of current and observing action of check valves and relays.

The electrical changes occurring within the armature circuits, Fig. 1 and similarly Fig. 2, with respect to the introduction of the cells 101 and 102 in the case of a dynamo, may be studied and discussed in connection with the explanatory diagram shown in Fig. 3. During the working period of the windings, that is to say from the position Q to the position D, the electrical changes take place as has already been set forth, except that at a position G intermediate of the positions B and F, when the left end of brush 35 has left segment 44, the electric check valve is to be introduced as hereinbefore set forth.

If the resistance 58 be not present, the current will not suffer any noticeable change because of the introduction of this cell, for the resistance of the latter is in general negligible. The duty of an inserted resistance would be to reduce the current strength and to produce some of the $I^2r$ loss outside of the check valve. If such resistance 58 be present, the value of the current will decrease, but the ohmic drop curve $Ir$, Fig. 3, will retain its significance notwithstanding. It will, furthermore, still serve to represent the current if a new scale be selected for this purpose.

In employing an electric check valve as set forth, no special regulation of the field curve during the switching period is required. The field curve need be regulated only so far as to make possible the parallel operation of the armature windings, as before set forth.

Fig. 5 shows the electrical conditions for a motor, and in which as is well-known the E. M. F. of the armature circuit is less than the terminal voltage. The current has naturally the opposite direction of that existing in a dynamo, as is shown in said Fig. 5. It will be noted that the electric check valve in this embodiment is connected in the opposite manner to that shown in Fig. 3.

The E. M. F. E must rise above the terminal voltage P in order to make the current reach a zero value, Fig. 5. If in addition to the check valve 102, a condenser 50 be employed, as more particularly set forth in my co-pending application, Serial #522,422, filed Oct. 13, 1909, the E. M. F. shall be regulated as shown in Fig. 6, that is, to a substantially constant value near the terminal voltage P, and the current will attain a zero value even if the counter E. M. F. E does not rise to the value of the terminal voltage P.

Fig. 4 illustrates the combination of a condenser 50 with an electric check valve 102 in the case of a dynamo. The check valve then assists the condenser and acts, furthermore, as a safety device should the condenser break down. A special auxiliary segment 54' may be provided for the condenser at the commutator. This introduction of the condenser compels the greater portion of the receding current to flow to the said condenser, and but a small current, therefore, passes through the cell. Heating of said cell is thus reduced to a minimum. The E. M. F. with the aforesaid arrangement may be maintained at constant value during the period of disconnection.

In the case where the machine is run as a motor, at the beginning of the starting period, the rise of current will take place under the influence of self-induction as in machine in which no check valve is employed. In order to attain a zero value of current in the outgoing winding during starting, the condensers 49 and 50 must be employed, Fig. 7, and with the condenser may also be employed resistance 57 and 58 within the armature circuit. The check valves 101 and 102 are used then as an additional safeguard; or, in turn, the condensers will reduce the load on the check valves by quickly diminishing the current.

As a means for regulating the field curve and combating armature reaction, means such as illustrated in Figs. 8 to 10 and Fig. 15 are employed. The armature 19 of the machine may be stationary and the field magnets 20 rotating, or vice versa, as in the device illustrated in Figs. 1 and 2. In addition to the said field magnets and armature, a small auxiliary armature 80 and an auxiliary field magnet 81 may be provided for superposing supplementary induced electro-motive force, as more particularly set forth in my co-pending application, Serial #522,422, filed Oct. 13, 1909. The armature 80 is constructed in the same manner and wound similarly to the armature 19, only its axial length and number of conductors is considerably less. Its windings 71—71', 72—72', 73—73', 74—74' are connected in series with the windings 31—31', 32—32', 33—33' and 34—34' respectively, Figs. 1 and 15. While the main armature 19 is absolutely stationary, the auxiliary armature 80 is circularly adjustable, Fig. 15, as by sliding in guides 82, and locked by suitable bolts 83. The setting is done once for all, the adjustment being such that the supplementary inductions to be provided are introduced at the desired time. The connections from armature to terminals are the same as have already been explained. Within the main armature 19 rotates the magnetic field magnets 20 as in the machine illustrated in Figs. 1 and 15. The auxiliary field magnets 81 is much smaller than the main field magnets 20 and rotates within the auxiliary armature 80 and should be designed to take care of the armature reaction and supplementary induced electro-motive force not furnished by the main field magnets. The pole-pitch, the size of the poles, and the magnetic polarities are so chosen that the supplementary induced electro-motive force provides the desired changes as per diagrams of E. M. F. and current (see Figs. 8, 9 and 10). Exciting windings 88 are provided for these poles, but the current therein need not necessarily be proportional to the armature current. However, in many cases it will be convenient to utilize the armature current for the excitation so that a reversal of the direction of revolution of the armature will cause the polarities of the field magnets to be reversed.

Instead of making the auxiliary armature 80, Fig. 15, adjustable as above set forth, the field magnets 81 may be arranged to be adjusted. This arrangement will be especially desirable when the armature rotates and the field magnets is stationary.

In a machine thus constructed with auxiliary armature and field magnets, the capacity of the auxiliary armature and field magnets need be hardly more than a few per cent of the entire capacity of the said machine. In thus employing auxiliary armature and auxiliary field magnets, a decided advantage is obtained in that the same may be controlled independently of the main field magnets and of the main armature, thus affording for the purpose of regulation the entire range of magnetic strength of said field magnets. If the regulation were to take place in the main field magnets, only a fraction of the latter's magnetic strength would be available and the adjustment of exciting current would therefore have to be the more delicate.

In the case of a dynamotor, Fig. 16, in addition to the main armature provided with a dynamo winding 90 and a motor winding 91, two auxiliary armatures 93 and 94 and two corresponding auxiliary field magnets 95 and 96 are required. The auxiliary system 93, 95 serves for the dynamo, and the system 94, 96 for the motor. Corresponding sets of accessories and connections to the terminals are of course necessary, the designations for the dynamo side being the same as used throughout the drawings, while those of the motor sides are primed.

It is understood that the invention is applicable to multi-polar or bi-polar machines. I also do not wish to restrict myself to the specific manner shown of connecting the armature windings, resistances, check valves and condensers with the terminals, except as limited by the appended claims.

I claim:—

1. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction only, and means to introduce said checking means into the armature circuits at predetermined periods.

2. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction only, and means to introduce said checking means into the armature circuits shortly before the armature windings are disconnected from the terminals of the machine.

3. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction only, means to introduce said checking means into the armature circuits shortly before the armature windings are disconnected from the terminals of the machine, and means to disconnect said checking means shortly after it is introduced into the armature circuits.

4. In a dynamo electric machine: the combination with suitable means for producing a magnetic field, an armature having windings of the open coil type, and a suitable commutator and brushes arranged to maintain the armature windings in circuit during predetermined periods; of one or more electrolytic cells, and means to introduce a said cell into the armature circuits at predetermined periods to check the flow of current in an armature circuit and in one direction only.

5. In a dynamo electric machine: the combination with suitable means for producing a magnetic field, an armature having windings of the open coil type, and a suitable commutator and brushes arranged to maintain the armature windings in circuit during predetermined periods; of one or more electrolytic cells, means to introduce a said cell into the armature circuits shortly before the armature windings are disconnected from the terminals of the machine to check the flow of current in an armature circuit and in one direction only, and means to disconnect said cell shortly after it is introduced into the armature circuits.

6. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction only, means to introduce said checking means into the armature circuits at predetermined periods, one or more resistances, and means to introduce resistance into the armature circuits at predetermined periods.

7. In a dynamo electric machine: the combination with suitable means for producing a magnetic field, an armature having windings of the open coil type, and a suitable commutator and brushes arranged to maintain the armature windings in circuit during predetermined periods; of one or more electrolytic cells, means to introduce a said cell into the armature circuits at predetermined periods, one or more resistances, and means to introduce resistance into the armature circuits simultaneously with the introduction of the said electrolytic cell.

8. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction only, means to introduce the same into the armature circuits at predetermined periods, and means to introduce suitable supplementary electromotive forces in the armature circuits at predetermined periods.

9. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction only, means to introduce said checking means into the armature circuits at predetermined periods, one or more condensers, and means to introduce a condenser into the armature circuits at predetermined periods.

10. In an electric motor the combination with suitable means for producing a magnetic field, an armature having windings of the open coil type, and a suitable commutator and brushes arranged to maintain the armature windings in circuit during predetermined periods; of means to check the flow of current in the armature circuits in one direction only, means to introduce said checking means into the armature circuits at predetermined periods, one or more condensers, and means to introduce a condenser into the armature circuits shortly before the armature windings are disconnected from the terminals of the machine.

11. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction only, and means to temporarily introduce said current checking means into the armature circuits shortly before the armature windings are connected to the terminals of the machine and also shortly before the said armature windings are disconnected from the terminals of the machine.

12. In a dynamo electric machine: the combination with suitable means for producing a magnetic field, an armature having windings of the open coil type, a commutator having two rows of main segments, the one row being positive and the other negative, and suitable brushes to bear upon said segments to connect the same with said windings, of auxiliary segments adjacent to said main segments, and one or more means to check the flow of current in the armature circuits in one direction only, said means being connected with said auxiliary segments.

13. In a dynamo electric machine: the combination with suitable means for producing a magnetic field, an armature having windings of the open coil type, a commutator having two rows of main segments, the one row being positive and the other negative, and suitable brushes to bear upon said segments to connect the same with said windings, of auxiliary segments adjacent to said main segments, and one or more electrolytic cells connected with said auxiliary segments.

14. In a dynamo electric machine: the combination with suitable means for producing a magnetic field, an armature having windings of the open coil type, a commutator having two rows of main segments, the one row being positive and the other negative, and suitable brushes to bear upon said segments to connect the same with said windings; of auxiliary segments adjacent to said main segments, one or more means to check the flow of current in the armature circuits in one direction, said means being connected with said auxiliary segments, segments intermediate of said main segments and said auxiliary segments, and one or more condensers connected with said intermediate segments.

15. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction, means to introduce the said current checking means into the armature circuits at predetermined periods, and means to accommodate said current checking means to a reversal in the direction of flow of the internal current of the machine.

16. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction, means to introduce the said current checking means into the armature circuits at predetermined periods, and means to automatically reverse the connection to said checking means in the event of a reversal in the direction of flow of the internal current of the machine.

17. In a dynamo electric machine: the combination with suitable means for producing a magnetic field, an armature having windings of the open coil type, and a suitable commutator and brushes arranged to maintain the armature windings in circuit during predetermined periods; of means to check the flow of current in the armature circuits in one direction, means to introduce the said current checking means into the armature circuits at predetermined periods, a pair of relays included in the armature circuit, current checking means respectively in series with each of said relays, the one being adapted for a current the reverse of the other, and suitable contacts controlled by said relays and connected with the said periodically introduced current checking means.

18. In a dynamo electric machine of the open coil type: means to check the flow of current in the armature circuits in one direction; means to introduce the same into the armature circuits at predetermined periods; one or more condensers, and means to introduce a condenser into the armature circuits at predetermined periods; and means to introduce suitable supplementary electromotive forces in the armature circuits at predetermined periods.

19. In a dynamo electric machine: the combination with suitable means for producing a magnetic field, an armature having windings of the open coil type, and a suitable commutator and brushes arranged to maintain the armature windings in circuit during predetermined periods; of means to check the flow of current in an entire armature circuit and in one direction only, and means to introduce said checking means consecutively into the armature circuits at predetermined periods.

20. In a dynamo electric machine: the combination with suitable means for producing a magnetic field, an armature having windings of the open coil type, and a suitable commutator and brushes arranged to maintain the armature windings in circuit during predetermined periods; of means to check the flow of current in an entire armature circuit in the direction opposed to the direction of flow therein during its working period, and means to introduce said checking means consecutively into the individual armature circuits shortly before the non-working periods.

Signed at New York, in the county of New York, and State of New York, this 30th day of August, A. D. 1911.

HANS LIPPELT.

Witnesses:
C. J. THATCHER,
FRED'K F. SCHUETZ.